Figure 1:
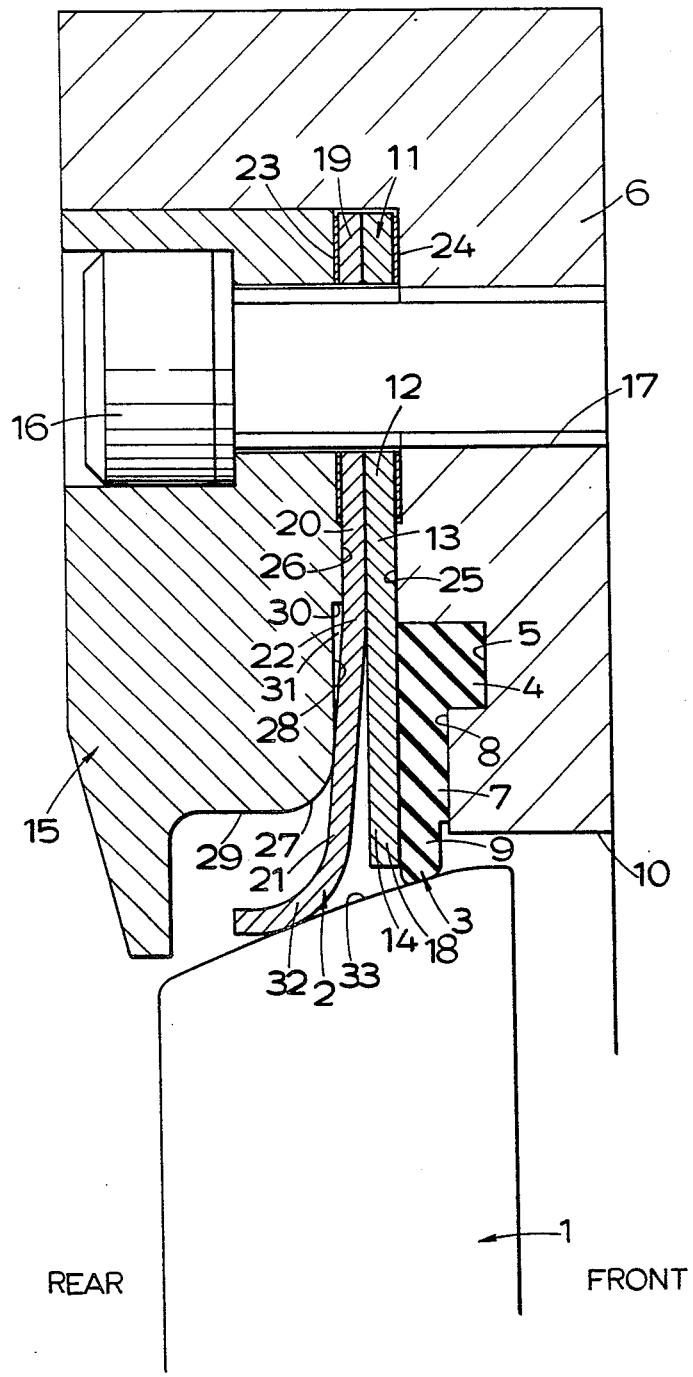

United States Patent [19]

Burton

[11] Patent Number: 4,898,363
[45] Date of Patent: Feb. 6, 1990

[54] BUTTERFLY AND BALL VALVES

[75] Inventor: Philip J. Burton, Great Barr, England

[73] Assignee: Charles Winn (Valves) Limited, Birmingham, England

[21] Appl. No.: 363,542

[22] Filed: Jun. 8, 1989

[30] Foreign Application Priority Data

Jun. 10, 1988 [GB] United Kingdom ............... 8813832
Jul. 21, 1988 [GB] United Kingdom ............... 8817411

[51] Int. Cl.4 .................................................. F16K 1/22
[52] U.S. Cl. ...................................... 251/173; 251/174
[58] Field of Search ................ 251/170, 172, 173, 174

[56] References Cited

U.S. PATENT DOCUMENTS

| 3,077,902 | 2/1963 | Vichery | 251/174 X |
| 3,252,684 | 5/1966 | Ksieshi | 251/172 |
| 3,841,347 | 10/1974 | Kushida | 251/172 X |
| 4,491,298 | 1/1985 | Beanchamp et al. | 251/173 X |
| 4,513,765 | 4/1985 | Rishord et al. | 251/173 X |

Primary Examiner—John Fox
Attorney, Agent, or Firm—Leydig, Voit & Mayer

[57] ABSTRACT

In a fire-safe butterfly valve a polymeric seat ring is resiliently biassed by a resilient metal energizer ring to hold the polymeric seat ring engaged with the closed valve disc, and an independent metal sealing ring permanently engages with the closed valve disc.

9 Claims, 2 Drawing Sheets

BUTTERFLY AND BALL VALVES

This invention relates to butterfly and ball valves of the kind incorporating a seal assembly which is intended to provide a residuary sealing action after being subjected to a fire. Such valves are widely used in the petrochemical industries.

More specifically, the invention relates to a fluid flow valve of the kind comprising a valve body provided with a fluid flow passage, a valve member pivotally mounted in the passage for rotation about an axis extending substantially transversely of the passage, and an annular seal assembly carried by the body and encircling the fluid flow passage, the edge of the valve member presenting a seal engaging surface which sealingly engages with the seal assembly at least in the closed condition of the valve member to close the flow passage in that condition, the seal engaging surface tapering radially inwardly of the valve from the front to the rear of the valve member.

Such a valve will hereinafter be referred to as "a valve of the kind set forth".

The terms "front" and "rear" of the valve member are used for convenience only and do not imply any preferred direction of fluid flow through the valve.

In our Specification G.B. No. 2 105 823 we have disclosed in FIGS. 2 and 3 a seal assembly for a butterfly valve of the kind set forth in which a polymeric seat ring of generally L-shape in transverse cross-section provides the normal sealing engagement with the butterfly disc and is resiliently loaded by a metal back-up seat ring of substantially flat form in its free state, apart from a rounded lip at its radially inner margin which provides an emergency seal with the disc after the polymeric seat has been affected by fire.

Whilst such a seal assembly can be designed to provide an effective sealing action for both forward and reverse flows through the valve, much expensive development work is required to determine the optimum shapes of the polymeric ring and metal ring when a new size of valve is required by the customer. Also, if the polymeric ring is only partially decomposed by fire it is possible in some circumstances that the metal ring may be prevented from providing an adequate back-up sealing action.

According to the present invention in a valve of the kind set forth the seal assembly comprises a polymeric sealing ring which is arranged normally to provide a first sealing engagement with the valve member, at least in the closed condition of the valve member, a substantially flat energiser ring which comprises a radially outer portion secured to the housing and a radially inner portion which abuts with the polymeric sealing ring, the dimensions of the energiser ring and polymeric sealing ring being chosen such that the energiser ring permanently exerts a force on the polymeric ring in the direction towards the front of the disc to urge the polymeric ring against a rearwardly facing abutment surface on the valve housing, the seal assembly further comprising a metal seat ring which provides a permanent resiliently biassed second sealing engagement with the valve member at the radially inner margin of the metal seat ring, and which comprises a radially outer metal seat ring portion which is sealingly held to the valve housing, the arrangement being such that the resilient loading exerted by the energiser ring on the polymeric seat is substantially independent of the resilient loading exerted on the valve member by the metal seat ring.

Thus we provide independently biassed, resiliently loaded first and second sealing engagements between the valve member and, respectively, a polymeric sealing ring and a metal sealing ring. Since the resilient loadings of the polymeric ring and metal sealing ring are independently produced, it is relatively easy to determine the production parameters for a new size of valve when such is required by a customer.

In normal use there is both a metal seal and a polymeric seal acting against the valve member to provide an enhanced sealing action. Whilst such a dual sealing action could be achieved with the composite seal structure of G.B. No. 2 105 823, by arranging that the metal seat/energiser ring always engages with the butterfly disc, the provision of an independent energiser ring in accordance with the present invention ensures that the polymeric sealing ring is adequately resiliently confined. Such resilient confinement of the polymeric sealing ring is found to be very desirable because the typical polymeric material P.T.F.E. has a tendency to creep, and the resilient loading acts to oppose this tendency by "extruding" the polymeric material radially inwardly against the valve member.

The use of an independent energiser ring enables the ratio of the resilient loadings of the metal seat ring and energiser ring to be chosen at will.

It is essential to retain an adequate seal in the burntout condition of the polymeric seat between the metal sealing ring outer portion and the valve body, and preferably this is provided by clamping the metal sealing ring outer portion to the housing radially outwardly of the polymeric seat.

For convenience the radially outer portions of both the metal sealing ring and the energiser ring are retained in place by a common retainer ring which is secured to the housing by suitable means.

Preferably the metal seat ring is positioned rearwardly of the polymeric seat ring If desired a spacer may be interposed between the clamped radially outer portions of the energiser ring and metal seat ring substantially to avoid any resilient interaction between those rings.

Preferably, however the radially outer portions of the metal rings are clamped in face contact with each other and the radially inner portions diverge from each other substantially from the junctions between their clamped and unclamped portions.

In a preferred embodiment the energiser ring and the metal seat ring are clamped in face contact with each other between opposed clamping faces on a retainer ring and valve housing respectively, and one ring of said energiser ring and said metal seat ring projects radially outwards beyond the other ring of said energiser ring and said metal seat ring, and the projecting portion of said one ring is sealed to the housing.

Preferably the projecting portion of said one ring is sandwiched between respective sealing gaskets which seal the projecting portion to the retaining ring and valve housing respectively.

Preferably said one ring is the metal seat ring.

Preferably the valve housing is stepped to define an annular recess to accommodate the clamped portion of the energiser ring.

Figure 2:
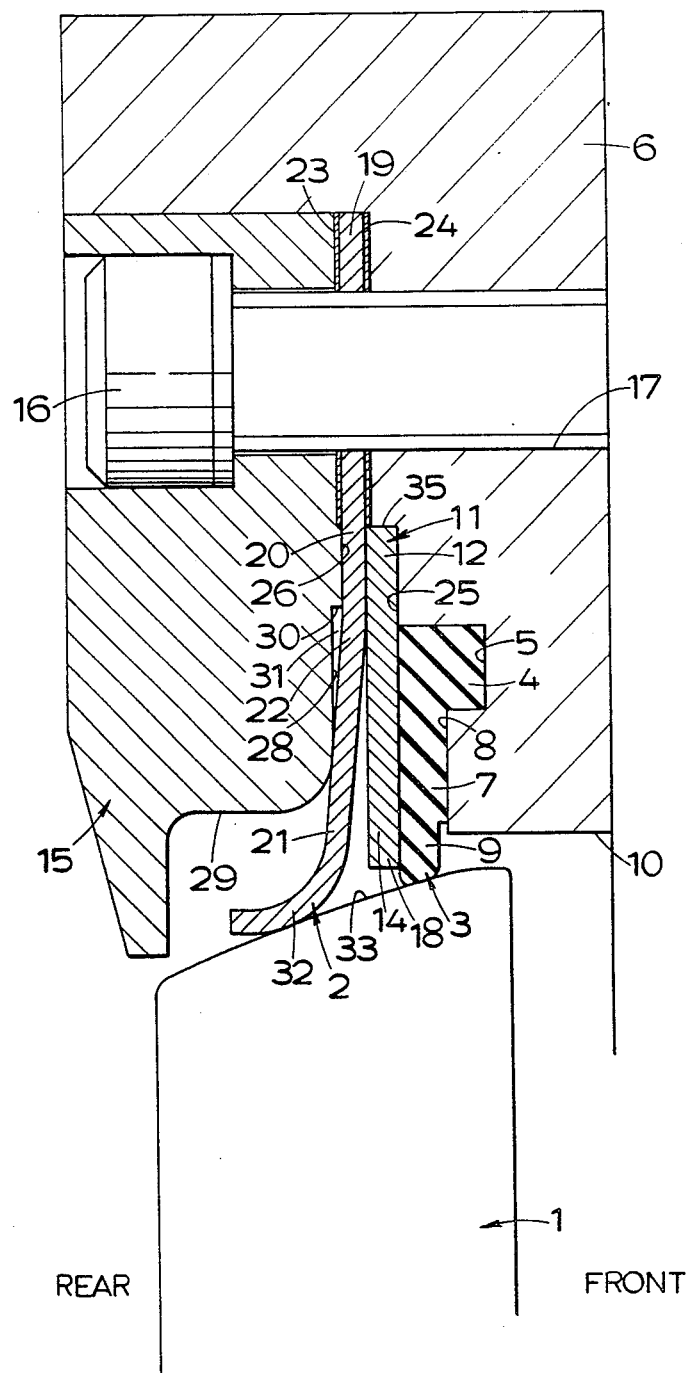

A butterfly valve assembly and a modification thereof both in accordance with the invention will now be described, by way of example only, with reference to the accompanying drawings in which:

FIG. 1 is a radial cross-section through an assembled valve housing and seal assembly with the disc in a partially closed condition; and FIG. 2 is a radial cross-section similar to FIG. 1 but of the modified valve.

With reference to FIG. 1, the drawing shows the disc 1 in a partially closed condition in which the disc has just come into engagement with the metal seat 2 and the polymeric (P.T.F.E.) seat 3.

Polymeric seat 3 is of substantially L-shape in radial cross-section comprising a locating heel 4 which is a close fit in a recess 5 of complementary shape provided in annular valve housing 6. The radially inwardly extending limb 6 of the seat 3 abuts for most of its length against a radial abutment surface 8 on housing 6, but the radially inward nose 9 of reduced thickness in the axial direction of housing 6 projects radially into the valve passage bounded by cylindrical housing surface 10.

A resilient metal energiser ring 11 has a clamped radially outer portion 12, a clamped intermediate portion 13, and a radially inner portion 14 which resiliently bears on the polymeric seat 3 substantially throughout its radial length. The initial axial dimensions of the seat 3, the axial dimensions of both the heel 4 and limb 7 are chosen such that the heel 4 is urged into recess 5 and limb 7 is urged against abutment face 8 on clamping up of the retaining ring.

The radially inner end portion 18 of energiser 11 extends radially inwards of surface 10 so as to provide support for the seal nose 9, but end portion 18 is preferably dimensioned, as shown, to be clear of the disc 1 in the closed condition of disc 1.

In the illustrated valve the retaining ring is clamped to the housing by a series of circumferentially spaced screws 16 in holes 17, but it should be appreciated that other known methods of securing the retaining ring 15 may be employed.

The metal seat 2 comprises a radially outer clamped portion 19, an intermediate clamped portion 20, and an inner portion 21 of substantially hockey stick shape, the seat 2, in its relaxed state, being provided with a circular fold line at the position 22 where the intermediate clamped portion 20 leads into the inner portion 21. Portions 19 and 20 are clamped in face contact with portions 12 and 13 respectively of the energiser ring. Annular graphite gaskets 23, 24 are positioned against portions 19 and 12 respectively, whereas intermediate portions 13 and 20 are directly clamped between opposing annular faces 25 and 26 of the housing 6 and retaining ring 15 respectively.

It is preferably arranged that the portion 21 of the metal seat 2 engages with a rounded abutment shoulder 27 in the assembled condition of the seat assembly before the disc is brought to the closed condition. Shoulder 27 is defined at a corner between a radial face 28 on the retaining ring and an axial face 29, the radial face 28 meeting a further axial face 30 on the housing which extends from point 22 in order to define a clearance space 31 to permit flexing of the portion 21 in the region radially inward of point 22.

The inner metal seat portion 21 comprises a rounded cusp 32 for engagement with the seal-engaging surface 33.

It will be appreciated that the clamping of both the outer portions 12, 19 and intermediate portions 13, 20 of the energising ring 11 and metal seat 2 provides a very effective sealing of those members to the housing. The metal to metal clamping action on portions 13 and 20 provides for very accurate location of the members 2, 11 and ensures adequate sealing under all conditions.

In the drawing the disc has closed to the position shown in which contact has just been made with the seats 2, 3. When the valve disc 1 is pivoted to the fully closed position, the nose 9 of polymeric seat 3 and the cusp 32 of metal seat 2 will be urged rearwardly, to the left in the Figure. Both the inner portion 14 of energiser 11 and the inner portion 21 of seat 2 will be deflected in the manner of Belleville washers to provide a resilient biassing force urging the nose 9 and cusp 32 against the disc edge 33. The initially straight limb of the portion 21 tends to roll around corner 26 and to become bowed, in cross-section.

The manner in which a seal is provided by a rolling-/wedging action between the cusp 32 of metal seat 2 and the disc surface 23 is substantially as described in our Specification G.B. No. 2 105 823, and reference should be had to that Specification for a more detailed discussion of the sealing action.

In addition to an axial deflection of nose 9 there is a tendency for nose 9 to be radially expanded, and since P.T.F.E. creeps under pressure, an important function of the energiser ring 11 is to compress limb 7 axially which will tend to extrude limb 6 radially inwards, thereby tending to restore the radial dimensions of nose 9 when the disc 1 is moved to an open condition, out of engagement with the seal assembly.

Substantial pressures on the front or rear of the disc 1 will cause axial deflection of the disc from the fully closed, unpressurised condition. If the disc moves further to the left in the Figure then the sealing action will be enhanced. If, however, the disc moves to the right an efficient seal is still maintained with both seats 2 and 3 due to the effective pre-loading of those seats against the fully closed disc.

In the event of a fire the polymeric seat 3 may be partially or completely disintegrated, yet the metal seat 2 will provide an adequate reserve seal, since its shape and clamping should remain substantially unaffected.

Surface 33 may be part-spherical, as shown, but it could be frusto-conical if desired.

The illustrated seal assembly could be applied to a ball valve, in which case the surface 33 would be the spherical outer surface of the valve ball.

In FIG. 2 corresponding reference numerals have been applied to the parts which correspond to those of the valve illustrated in FIG. 1. Only the differences between the two constructions need be discussed.

As shown in FIG. 2, the energiser ring 11 has its radially outer portion 12 received in an annular recess of complementary shape in the housing 6, bounded by a step 35. The outer portion 12 of the energiser ring 11 is clamped in face contact with the intermediate portion 20 of the metal seat ring 2 between faces 25 and 26 of the housing 6 and retainer ring 15 respectively. In this manner the outer portion 11 of the energiser ring 11 is securely held in position.

Annular gaskets 23,24 extend radially outwards from the step 35 and are positioned in face contact with the opposite sides of the radially outer portion 19 of the metal ring 2, through which screws 16 extend.

It will be appreciated that the gasket 24 will serve to block the potential leakage path between the clamped portions of metal ring and the energiser ring 11, which is present in the FIG. 1 construction.

We claim:

1. A fluid flow valve comprising a valve body provided with a fluid flow passage, a valve member pivotally mounted in said passage for rotation about an axis extending substantially transversely of said passage, an annular seal assembly carried by said body and encircling said fluid flow passage, an edge of said valve member presenting a seal engaging surface which sealingly engages with said seal assembly at least in the closed condition of said valve member to close said flow passage in that condition, said seal engaging surface tapering radially inwardly of the valve from a front to a rear of said valve member, said seal assembly comprising a polymeric sealing ring which is arranged normally to provide a first sealing engagement with said valve member, at least in the closed condition of said valve member, a substantially flat energiser ring which comprises a radially outer portion secured to said housing and a radially inner portion which abuts with said polymeric sealing ring, said energiser ring and polymeric sealing ring having dimensions chosen such that said energiser ring permanently exerts a force on said polymeric ring in a direction towards said front of said disc to urge said polymeric ring against a rearwardly facing abutment surface on said valve housing, said seal assembly further comprising a metal seat ring which provides a permanent resiliently biassed second sealing engagement with said valve member at a radially inner margin of said metal seat ring, and which comprises a radially outer metal seat ring portion which is sealingly held to said valve housing, the arrangement being such that the resilient loading exerted by said energiser ring on said polymeric seat is substantially independent of the resilient loading exerted on said valve member by said metal seat ring.

2. A valve as claimed in claim 1 wherein said metal sealing ring outer portion is clamped to said housing radially outwardly of said polymeric seat.

3. A valve as claimed in claim 1 or claim 2 wherein said radially outer portions of both said metal sealing ring and said energiser ring are retained in place by a common retainer ring which is secured to said housing by suitable securing means.

4. A valve as claimed in claim 3 wherein said metal seat ring is positioned rearwardly of said polymeric seat ring.

5. A valve as claimed in claim 3 in which said radially outer portions of said metal rings are clamped in face contact with each other, and said radially inner portions diverge from each other substantially from where their clamped and unclamped portions meet.

6. A valve as claimed in claim 3 wherein said energiser ring and said metal seat ring are clamped in face contact with each other between opposed clamping faces on a retainer ring and valve housing respectively, and one ring of said energiser ring and said metal seat ring projects radially outwards beyond the other ring of said energiser ring and said metal seat ring, and the projecting portion of said one ring is sealed to said housing.

7. A valve as claimed in claim 6 in which the projecting portion of said one ring is sandwiched between respective sealing gaskets which seal the projecting portion to said retaining ring and said valve housing respectively.

8. A valve as claimed in claim 6 in which said one ring is the metal seat ring.

9. A valve as claimed in claim 8 in which said valve housing is stepped to define an annular recess which receives said radially portion of said energiser ring.

* * * * *